3,770,652
GLASSY SILICATE CORROSION INHIBITOR WITH
  CONTROLLED SOLUTION RATE
Robert Cornelius Gordon, Jr., Rochester, Pa., assignor
  to Calgon Corporation, Pittsburgh, Pa.
No Drawing. Filed June 12, 1972, Ser. No. 261,626
    Int. Cl. C23f 11/18
U.S. Cl. 252—387                               13 Claims

ABSTRACT OF THE DISCLOSURE

The corrosion of metals, especially copper, in an aqueous system is inhibited by treating the water with a glassy, controlled solubility rate, silicate composition consisting essentially of $SiO_2$ and metal oxides in a molar ratio of $SiO_2$ to metal oxide of from about 1.35:1.0 to about 1.0:1.35 wherein the preferred metal oxides are $K_2O$, $Na_2O$, and $CaO$.

BACKGROUND OF THE INVENTION

This invention is directed to glassy silicate compositions with controlled solution rate and their use as corrosion inhibitors for metals in contact with aqueous systems. More particularly, it relates to sodium/potassium/calcium silicate glasses and their use as corrosion inhibitors for metals, especially copper, in contact with aqueous systems.

The use of silicates as corrosion inhibitors is old in the art. For example, see the article entitled, "Some Experiences with Sodium Silicate as a Corrosion Inhibitor in Industrial Cooling Waters," by J. W. Wood, J. S. Beecher and P. S. Laurence found in "Corrosion," vol. 13, pp. 719 to 724 (1957). See also, "Silicate as a Corrosion Inhibitor in Water Systems," by H. L. Shuldener and S. Sussman found in "Corrosion," vol. 16, pp. 354 to 358 (1960). In addition, see "Silicates in Water Treatment," by S. Sussman found in "Industrial Water Engineering," vol. 23, pp. 23 to 26 (1966). Silicates have also been the subject of several U.S. patents on corrosion prevention. For example, see Freyhold U.S. Patent 3,093,493; Clerbois U.S. Patent 3,215,637; and Forsyth U.S. Patent 3,522,066. In addition, see Seidl U.S. Patent 2,978,361. However, all of the prior art compositions were directed to silicate solutions or silicate compositions which were not glassy silicates with a controlled solubility rate.

SUMMARY OF THE INVENTION

I have found that the corrosion of metals in contact with aqueous systems can be greatly inhibited by treating the water of the system with a glassy silcate composition with a controlled solution rate. The glassy silicate composition consists essentially of $SiO_2$ and metal oxides in a molar ratio of $SiO_2$ to metal oxide of from about 1.35:1.0 to about 1.0:1.35. The preferred molar ratio is from 1.1:1 to 1:1.1. The metal oxides are selected from the alkali metal oxides and alkaline earth metal oxides with at least one metal oxide from each class. In addition, the metal oxide may be ZnO or CdO. The preferred metal oxides are $Na_2O$, $K_2O$, $CaO$ and $ZnO$.

The glassy compositions of my invention have a controlled solution rate. Therefore, they may be utilized without necessitating the dissolving of the glass to form a feed solution and the use of calibrated liquid feeding devices. The glassy compounds may be added to the water system and the desired concentration of the composition obtained by using the controlled solution rate of the glassy silicates.

In addition, the glasses of my invention have a nonfouling surface. When the glassy silicate particles are placed in an aqueous system, the surface of the particles remain nonfouling, i.e., the particles do not agglomerate but remain as discrete separate particles. These characteristics are important for self-feeding glassy silicate compositions. Prior to the present invention, there were no compounds having the beneficial combination of elements.

I have found that controlled solution rate glassy silicates having a molar ratio of $SiO_2$ to metal oxide of 1.35:1.0 to 1.0:1.35 can be prepared by a judicious selection of the metal oxide. The metal oxide must be a combination of alkali metal oxides and alkaline earth metal oxides. The alkali metal silicates are very soluble while the alkaline earth metal silicates are quite insoluble. By varying the ratio of alkali metal to alkaline earth metal, the solubility rate of the glassy silicate may be controlled. It is also possible and beneficial to substitute a group 2b metal such as Zn or Cd for part or all of the group 2a alkaline earth metal. Both Zn and Cd increase the corrosion inhibition properties of the silicate compositions. The preferred metal is Zn since it does not have the toxicity problem which is inherent with the use of Cd.

In preparing the controlled solution rate glassy silicate, the metal oxide portion is selected from alkali metal, alkaline earth metal, zinc, and cadmium as mentioned above. When using alkaline earth metals along with the alkali metal, the molar ratio of alkaline earth metal to alkali metal should be at least about 1:4 but not greater than about 1:1. However, when using zinc or cadmium, the ratio of zinc or cadmium to alkali metal oxide should be about 1:10 to 1:2. When using a combination of alkaline earth metal and zinc or cadmium, the ratio will fall within the ones described above as is recognized by one skilled in the art. The alkali metal portion may be composed of one or more of the various alkali metals. I prefer the use of sodium and potassium. However, it is possible to use just one alkali metal. Similarly, the alkaline earth metal portion may be composed of one or more of the alkaline earth metals.

As mentioned above, the ratio of $SiO_2$ to metal oxide is from about 1.35:1.0 to about 1.0:1.35 with the preferred range being from 1.1:1.0 to 1.0:1.1. As is known in the art, the only true glassy silicate composition contains a ratio of $SiO_2$ to metal oxide of about 1:1. Therefore, by glassy silicate compositions, I mean to include not only the true glassy compositions but also those compositions containing partial crystallinity so long as they fall within the composition ratios and have the requisite solubility rate.

The solution rates of my glassy compositions should be in the range of 5 to 100 percent per month. The solution rates are determined by placing a known amount of the material in water and agitating for a period of time, analyzing the solution for dissolved solids, and if the period of time is not one month, extrapolating the data to a month in terms of percent material dissolved per month. By 5 to 100 percent per month is meant that between 5 and 100 percent of the glassy sample tested dissolves in a month.

The rate of solution of the glassy compositions can be altered by changing the metal oxide ratios and/or by changing the particle size since solution rate is directly proportional to surface area. The novelty of the compositions encompassed by this application is that they are soluble at rates useful for water treatment when manufactured in sizes convenient for use in standard controlled solution rate type equipment (from about 30 mesh U.S. Sieve Series to about ½ inch).

The glassy silicate compositions of my invention may be made by a high temperature dehydration process. The glassy compositions are fused at about 800 to 1200° C. However, it is possible to use higher temperatures, and the scope of my invention is independent of the method of manufacturing. After the glassy composition is fused at a high temperature, it is rapidly cooled as plates which may subsequently be broken into the desired particle size. It should be noted that the substitution of potassium for part or all of the alkali metal constituent results in a glassy composition which fuses at a lower temperature and is, therefore, less aggressive to the furnace.

I have prepared numerous glassy silicate compositions of my invention and have tested their rates of solution. The rates of solution were determined by placing the glassy compositions in the 12 to 14 mesh range in water at a weight ratio of one part glassy silicate per thousand parts of water. The solutions were stirred and analyzed to find out the concentration of $SiO_2$ in the solution. From these values, the rates of solution were determined. Table 1 lists a series of various glassy compositions of my invention and their solubility rates.

Table 1

| Composition (distilled water pH 6 to 7) | Solubility rate (12 to 14 mesh, 25° C.) |
|---|---|
| $1SiO_2 : \cdot 33K_2O + \cdot 33Na_2O + \cdot 33ZnO$ | 6%/month |
| $1SiO_2 : \cdot 33Na_2O + \cdot 33K_2O + \cdot 33CdO$ | 39%/month |
| $1SiO_2 : \cdot 3Na_2O + \cdot 4K_2O + \cdot 3MgO$ | 27%/month |
| $1SiO_2 : \cdot 33Na_2O + \cdot 28K_2O + \cdot 32CaO$ | 55%/month |
| $1SiO_2 : \cdot 2Na_2O + \cdot 28K_2O + \cdot 2CaO$ | 88%/month |
| $1SiO_2 : \cdot 3Na_2O + \cdot 4K_2O + \cdot 3CaO$ | 50%/month |

The glassy composition may be prepared from a variety of different starting materials. I have prepared glassy silicate compositions using silicic acid, sodium silicate, and potassium silicate as a source of $SiO_2$. Some other sources of $SiO_2$ are calcium metasilicate and magnesium metasilicate. I have used potassium hydroxide, potassium carbonate, and potassium silicate as a source of potassium. I have used sodium hydroxide, sodium carbonate, and sodium silicate as a source of sodium. The sources of calcium which I have used are calcium hydroxide, calcium carbonate, and calcium oxide. Other sources of calcium are calcium metasilicate and calcium magnesium metasilicate. The sources of cadmium and zinc are CdO, $Cd(OH)_2$, $CdCO_3$, ZnO, $Zn(OH)_2$, and $ZnCO_3$.

I have tested the glassy silicate compositions of my invention for their corrosion inhibiting properties. The tests were performed by recirculating distilled water from a receptacle through a standard length of one fourth inch copper tubing back into the receptacle. In one receptacle was added a glassy silicate composition. In another receptacle only distilled water was used. The pH of both the pure, distilled water and the silicate-containing water was adjusted to 5.9. A sample of both recirculated waters was analyzed for copper after ten days, twenty days, and thirty days. The percent corrosion inhibition was calculated from these values. The glassy composition used for this test was $1SiO_2 \cdot 0.3Na_2O + 0.4K_2O + 0.3CaO$ and had a solubility rate of about 50 percent per month. The results showed an inhibition of 60 percent after ten days, 76 percent after twenty days and 83 percent after thirty days. The blue-green copper complex stain evident on the outlet of the non-treated system was non-existent on the treated system. In addition, the glassy silicate particles remained nonfouling and no precipitation occurred.

In addition, I have performed similar experiments with various other silicate compositions of my invention on different metals and under different pH, temperature, etc. conditions. The results indicate that the glassy silicates of my invention are good corrosion inhibitors.

The glassy silicate compositions of my invention have been found to be very effective corrosion inhibitors when maintained in water systems in low concentrations. The exact silicate concentration needed for effective corrosion inhibition will depend upon the particular characteristic of the system being treated, the metal to be protected, the oxygen concentration, the solution pH, temperature, flow rate, and other factors normally found important in determining the susceptibility of a particular water system to corrosion. Very low concentrations will inhibit to a limited extent. Generally speaking, the upper limit will be determined by economic considerations. However, maintenance of less than about 25 p.p.m. will be sufficient in most commercial water systems.

Thus, it may be seen that my invention is directed to glassy silicate compositions which have a controlled solution rate, a nonfouling surface and form a stable solution and to their use as corrosion inhibitors.

I claim:

1. A glassy silicate composition having a controlled solution rate consisting essentially of $SiO_2$ and metal oxides in a molar ratio of $SiO_2$ to metal oxide of from about 1.35:1.0 to about 1.0:1.35 and wherein the metal oxide component consists of at least one alkali metal oxide and at least one alkaline earth metal oxide.

2. A glassy silicate composition as in claim 1 wherein the alkali oxide is sodium and potassium and the alkaline earth metal oxide is calcium.

3. A glassy silicate composition as in claim 1 wherein part or all of the alkaline earth metal oxide is replaced by zinc oxide.

4. A glassy silicate composition as in claim 1 wherein the ratio of $SiO_2$ to metal oxide is from 1.1:1.0 to about 1.0:1.1.

5. A glassy silicate composition having a controlled solution rate consisting essentially of $SiO_2$ and metal oxides in a molar ratio of $SiO_2$ to metal oxide of from about 1.35:1.0 to about 1.0:1.35 and wherein the metal oxide component consists of at least one alkali metal oxide and at least one alkaline earth metal oxide wherein the molar ratio of alkaline earth metal to alkali metal is from about 1.0:4.0 to about 1.0:1.0.

6. A glassy silicate composition as in claim 5 wherein the alkali metal oxide is potassium and sodium and the alkaline earth metal oxide is calcium.

7. A glassy silicate composition as in claim 6 wherein the ratio of $SiO_2$ to metal oxide is from 1.1:1.0 to 1.0:1.1 and wherein the ratio of alkaline earth metal oxide to alkali metal oxide is 1.0:2.0.

8. A method of inhibiting the corrosion of metals in a water system comprising adding to the water of the system an effective amount of a glassy silicate composition having a controlled solution rate consisting essentially of $SiO_2$ and metal oxides in a molar ratio of $SiO_2$ to metal oxide of from about 1.35:1.0 to about 1.0:1.35 and wherein the metal oxide component consists of at least one alkali metal oxide and at least one alkaline earth metal oxide.

9. A method of inhibiting the corrosion as in claim 8 wherein the alkali metal oxide is sodium and potassium and the alkaline earth metal oxide is calcium.

10. A method of inhibiting the corrosion as in claim 8 wherein part or all of the alkaline earth metal oxide is replaced by zinc oxide.

11. A method of inhibiting the corrosion as in claim 8 wherein the ratio of $SiO_2$ to metal oxide is from 1.1:1.0 to about 1.0:1.1.

12. A method of inhibiting the corrosion of metals in a water system comprising adding to the water of the system an effective amount of a glassy silicate composition having a controlled solution rate consisting essentially of $SiO_2$ and metal oxides in a molar ratio of $SiO_2$ to metal oxide of 1.35:1.0 to 1.0:1.35 and wherein the metal oxide component consists of at least one alkali metal oxide and at least one alkaline earth metal oxide wherein the molar ratio of alkaline earth metal to alkali metal is from 1.0:4.0 to about 1.0:1.0.

13. A method of inhibiting the corrosion as in claim 12 wherein the ratio of $SiO_2$ to metal oxide is from 1.1:1.0 to 1.0:1.1 and wherein the ratio of alkaline earth metal oxide to alkali metal oxide is 1.0:2.0 and wherein the alkali metal oxide is potassium and sodium and the alkaline earth metal oxide is calcium.

References Cited
UNITED STATES PATENTS

| | | | |
|---|---|---|---|
| 3,009,872 | 11/1961 | Snell et al. | 252—387 |
| 3,215,637 | 11/1965 | Clerbois | 252—387 |
| 3,523,085 | 8/1970 | Shannon | 252—387 |
| 3,580,934 | 5/1971 | Murray et al. | 21—2.7 R |
| 3,655,582 | 4/1972 | Dupre et al. | 21—2.7 R |

HERBERT B. GUYNN, Primary Examiner

I. GLUCK, Assistant Examiner

U.S. Cl. X.R.

21—2.7 R; 106—74; 252—8.55 E, 80, 175